Patented Oct. 6, 1936

2,056,668

UNITED STATES PATENT OFFICE 2,056,668

METHOD OF DEHYDRATING OIL EMULSIONS

George D. Bavin, Los Angeles, and Max Powell, San Gabriel, Calif., assignors to Specialty Sales Corporation, Ltd., Los Angeles, Calif., a corporation of California No Drawing. Application May 9, 1936, Serial No. 78,894

15 Claims. (Cl. 196—4)

This invention relates generally to the treatment of mineral oil or petroleum emulsions, and may be particularly characterized as an improved chemical process for breaking oil and water emulsions by the use of reagents containing fermentation products of micro-organisms. In this respect, among others, the invention presents certain distinctive departures from the customary emulsion treating reagents and methods, and from all known petroleum emulsion treating processes involving the use or action of bacteria or other micro-organisms.

Heretofore it has been proposed to de-emulsify petroleum emulsions by subjecting them to the action of living micro-organisms in the presence of a life sustaining medium, all in a manner such that the micro-organisms themselves act directly upon the emulsifying agent to destroy its effectiveness as such, and thereby cause the emulsion particles to coalesce and settle out. In that type of process, fermentation occurs directly within the emulsion over a period of time extended sufficiently to permit the growth of micro-organisms in numbers required for the effective destruction of the emulsifying agent. It follows, of course, that the composition of the de-emulsifying reagent (the ferment solution) varies as fermentation progresses, and that the reagent itself, i. e., the live micro-organism culture, has by its nature certain unstable characteristics, as for example its susceptibility to changes under varying temperature conditions, as distinguished from stable solutions that are inert insofar as micro-organic life is concerned.

The present process also involves the use of micro-organisms but differs characteristically from such methods as above outlined, in that instead of relying upon the presence of live organisms in the emulsion to attack and render ineffective the emulsifying agent, it employs the micro-organisms for the purpose of producing, as a fermentation product, a de-emulsifying reagent whose effectiveness is independent of the presence of live organisms in the emulsion itself. In accordance with the invention, we first produce the reagent by fermentation of an inoculated solution, and then, after all or substantially all bacterial activity is stopped, either by allowing the fermentation to continue to exhaustion or by deliberately stopping fermentation after certain products are formed, we treat the emulsion with the fermentation products. Preferably, or at least for the treatment of most emulsions, we also include in the reagent thus formed, a substance that serves to activate the reagent in the respect that it increases its de-emulsifying effectiveness. As will later appear, this activating substance may advantageously serve the additional purpose of stopping fermentation in the reagent producing solution and of finally stabilizing the solution itself.

In comparison with known methods of utilizing bacterial action for the de-emulsifying of petroleum oils, the present process is distinguished in that it provides a prepared reagent of high de-emulsifying efficiency that may at any time be added to the emulsion to be treated. Whereas all live bacteria solutions are unstable, particularly where subject to temperature variations, the present reagent is stable, and since it may be made at a central plant equipped with definite temperature and laboratory controls, its properties, or at least its de-emulsifying properties, may be properly regulated in advance of its actual use in the emulsion. Outstanding among the advantages of this reagent is its ability to quickly break extremely stable emulsions at normal temperatures, that is, without having to heat the oil, and without the necessity for agitation.

In carrying out the process, the general procedure of producing the reagent involves inoculating a fermentable solution, allowing fermentation to progress over a period of time under controlled temperature, and finally destroying further organic activity by such methods as hereinafter described. It may be stated generally of the fermentation product going to make up the reagent, that because of its chemical complexity and difficulty of complete analysis, all the substances and compounds present therein are not fully known. Consequently, the de-emulsifying properties of some of the individual and unidentified constituents of the fermentation product, and their effect upon the de-emulsifying properties of the product as a whole, cannot definitely be stated.

However, it is believed that those properties are due in a large masure to the presence of some of the higher alcohols, such as ethyl, amyl, butyl and iso-butyl alcohols. Tests have indicated the desirability of having present in the product at least from 8 to 16% by volume of those alcohols. The fermentation may also result in the formation of a series of organic acids which, at least for the treatment of certain types of emulsions, also have individually or in combination with other compounds present in the product, de-emulsifying properties. At present it appears that for the treatment of all petroleum emulsions, it is desirable that the reagent have a substantial content of alcohols, and that while a certain amount of acids always will be present in greater or lesser proportions, the inoculent may be selected to vary the acid content of the reagent within rather wide limits depending upon the characteristics of the emulsion. That is to say, some emulsions will be most readily broken by a reagent of comparatively high acid content, whereas others will respond more quickly to a reagent of low acid content. Various aldehydes may also be included in the reagent either as direct fermentation products, or by the oxidation or reduction of some of the alcohols by other fermentation products, or by the addition of compounds that will result in the formation of aldehydes.

The solution to be fermented may comprise any suitable carbohydrate, together with the necessary salts, that will provide a medium for the sustenance and growth of the micro-organisms with which the solution is inoculated. For example, I may use such carbohydrates as sucrose, maltose, lactose, raisins, grapes, inulin, potatoes, peptone, corn, barley, rye, oats, etc. To the carbohydrate may be added such salts as ammonium sulphate, tartaric acid, magnesium sulphate, ammonium tartrate, sodium and potassium phosphates and their derivatives. The following may be cited as typical inoculating solutions:

1. Sucrose _____ parts__ 50
   Ammonium sulphate _____ parts__ 5
   Tartaric acid _____ part__ 1
   Magnesium sulphate _____ part__ 1/16
   Water _____ parts__ 1000

2. Sugar _____ pounds__ 8
   Ammonium sulphate _____ ounce__ 1/3
   Tartaric acid _____ ounce__ 1/6
   Magnesium sulphate _____
   Sodium phosphate _____ ounce each__ 1/30
   Water _____ gallons__ 5

3. Raisins _____ parts__ 400
   Ammonium chloride _____ parts__ 2
   Water _____ parts__ 1000

The carbohydrate solution may be inoculated with a culture of any suitable micro-organisms, including bacteria, molds or fungi. The particular inoculant may be selected to give a reagent of predetermined composition, or in accordance with the type and characteristics of the emulsion to be treated. Preferably, the inoculant will be selected to produce a fermentation product of the general characteristics described above, i. e., a product having an alcohol content of at least 8 to 16%, together with organic acids. Typically, the culture may contain a mold of the family saccharomycetaceae, in which family the genus saccharamyces embraces species that are generally suitable inoculants. For example, the species cereveseae may advantageously be used as the inoculant for the reason that this particular species promotes the formation of alcohols in the ferment. As a further example: In case it is desired to increase the acid content in the ferment over that which normally would result from the cereveseae inoculant alone, we may include in the culture another type or specie of bacillus or mold, for example the penicillium of the genus saccharamycea, which acts as an acid producing culture to a greater extent than the cereveseae. Where two types or species of micro-organisms are included in the inoculant, preferably they are cultured in symbiosis, that is, in the same culture or environment. It will be understood that the constituency of the culture may be predetermined or adjusted in any suitable manner, as by the selection of any one particular species of micro-organism, or combination of species, to produce the most effective reagent for any given emulsion as regards the relative or absolute proportions of acids and alcohols in the reagent.

Fermentation of the solution is allowed to progress over a period of time at controlled temperatures that may range from 50 to 100° F. and until the desired alcoholic content is formed. Fermentation may be permitted to proceed naturally to exhaustion, i. e. natural discontinuance of bacterial activity when the carbohydrate is consumed, or fermentation and all bacterial activity may artificially be stopped short of complete natural exhaustion, providing the ferment has produced a sufficient alcohol constituency. In general practice, though not necessarily in all instances, we prefer to terminate the fermentation at or toward the end of natural exhaustion by some suitable expedient that will stabilize the fermentation product by destroying the spores and latent organisms, and thus prevent further bacterial activity. Heat may be used as a means of destroying the spores and organisms, although heating is less desirable in that it may destroy certain desirable enzymes and other fermentation products, and volatilize some of the ferment constituents that appear to be valuable as de-emulsifying agents.

The better method is to terminate fermentation and all bacterial activity by adding to the ferment a chemical that destroys all micro-organic activity. Where it is desired of the chemical merely to destroy micro-organic life, any suitable compounds capable of serving the purpose may be used, for example: sodium benzoate, tricresol or other phenol derivatives, mercury, salts, and other known bactericides. Preferably, however, we use a chemical that serves the dual purpose in that it not only destroys bacterial activity, but also activates the product in such manner as to greatly increase its effectiveness as a de-emulsifying reagent. The best type of activating chemicals appears to be certain of the water soluble salts which destroy micro-organic life and also ionize to a high degree when put into the emulsion. We prefer to use, and may cite as typical, salts of cyanogen in combination with a metal base. For example, particularly good results have been obtained by adding to the reagent either potassium thio-cyanate or sodium thio-cyanate, in the proportion of from 1 to 4 ounces of the thio salt to one gallon of the fermentation product. We may use other cyanogen compounds, for example ammonium thio-cyanate, which will kill all live organisms in the fermentation product and dissociate to a high degree in the aqueous phase of the emulsion.

Although it has been definitely ascertained that these cyanogen salts have a very definite activating effect upon the reagent, all the reasons why that effect is brought about are not fully understood. It is known that in the reagent itself, the thio-cyanates display a physical affinity for water and alcohol, and that the salt dissociates to some extent in the reagent, depending upon the proportion of salt-dissolving constituents in the reagent. When the reagent is added to the emulsion, however, the salt undergoes considerably greater dissociation, due of course to the comparatively large amount of water present in the emulsion. The salt apparently has a direct activating effect upon the alcohols, probably at least to some extent by virtue of a mutual solubilizing effect on the alcohols with water, and its tendency to increase the effective dispersibility of the alcohols within the emulsion. As the salt dissociates with increased dilution of the salt-dissolving phase of the emulsion, the acidity of the reagent increases by reason of the liberation of the thio-cyanate radical, and at the same time some reaction or combination likely takes place between the liberated metallic ions and the alcohols. All effects combine to increase the effectiveness and directness with which the reagent breaks down the emulsion.

It will be unnecessary to illustrate or describe in detail all the various physical methods by which the reagent may be mixed with the emulsion to be treated. It will suffice to state that we may use any of the usual methods of securing an intimate admixture between the reagent and emulsion. For example, where the oil is flowing or being pumped from the well into a storage or treating tank, the reagent may be introduced directly into the well or at any suitable point in the flow line between the well and tank, or into the tank itself. In the majority of instances we prefer to inject the reagent at a controlled and measured rate into the flow line, in order that the turbulent flow in the line may be utilized to effect thorough dispersion of the reagent throughout the emulsion. Once the reagent is thoroughly admixed with the emulsion in the tank, no further agitation is required, nor does it appear that it is necessary to supply heat to the oil. The ability of the reagent to effectively break down the emulsion at normal atmospheric temperatures, is a highly important advantage over the most successful de-emulsifying reagents heretofore used, since the latter usually require, in order that they may be fully effective, heating of the emulsion to temperatures that may range upwards of 140° F. with the result that a substantial proportion of the lighter and more valuable constituents of the oil are lost by volatilization.

The effectiveness of the present process and reagent for de-emulsifying petroleum oils, may be illustrated by reference to a particular run in which a 500 barrel lot of 28° A. P. I. gravity oil and water emulsion was treated. This particular emulsion, containing about 85% water, was pumped into a tank at a uniform rate over a period of twenty-four hours. During this period, three gallons of reagent that had been prepared in accordance with the foregoing description, were injected into the flow line leading to the tank. Afterward, the emulsion was allowed to stand for the next twenty-four hours, at the end of which time the water phase that had settled out of the emulsion was drawn from the tank and the oil tested for water. The water content of the oil was substantially 0.3%.

We claim:

1. The process of treating crude petroleum emulsions that includes intimately admixing with the emulsion a prepared reagent containing fermentation products of micro-organisms but substantially free of such living organisms.

2. The process of treating crude petroleum emulsions that includes, intimately admixing with the emulsion a non-fermenting reagent containing the products of a fermented carbohydrate solution inoculated with micro-organisms.

3. The process of treating crude petroleum emulsions that includes, intimately admixing with the emulsion a prepared reagent containing a series of the higher alcohols produced by the action of micro-organisms in a fermentable solution, said reagent being substantially free of such living organisms.

4. The process of treating crude petroleum emulsions that includes intimately admixing with the emulsion a prepared reagent containing a mixture of the higher alcohols and organic acids produced by the action of micro-organisms in a fermentable solution, said reagent being substantially free of such living organisms.

5. The process of treating crude petroleum emulsions that includes intimately admixing with the emulsion a prepared reagent containing fermentation products of micro-organisms, said reagent being stabilized against substantial change in composition by fermentation.

6. The process of treating crude petroleum emulsions that includes intimately admixing with the emulsion a prepared reagent containing fermentation products of micro-organisms, said reagent containing a chemical stabilizing it against substantial change in composition by fermentation.

7. The process of treating crude petroleum emulsions that includes intimately admixing with the emulsion a prepared reagent containing fermentation products of micro-organisms, said reagent containing a cyanogen salt in combination with a metal base.

8. The process of treating crude petroleum emulsions that includes, treating the emulsion with a material comprising the fermentation products of micro-organisms, and a micro-organism destroying reagent.

9. The process of treating crude petroleum emulsions that includes, treating the emulsion with a material comprising the fermentation products of micro-organisms, and a cyanogen salt.

10. The process of treating crude petroleum emulsions that includes, intimately admixing with the emulsion a non-fermenting reagent containing the products of a fermented carbohydrate solution inoculated with micro-organisms of the genus saccharamyces.

11. The process of treating crude petroleum emulsions that includes, intimately admixing with the emulsion a non-fermenting reagent containing the products of a fermented carbohydrate solution inoculated with acid and alcohol producing micro-organisms in such manner that the ferment produces an excess of alcohols over the acids.

12. The process that includes, fermenting a carbohydrate solution containing micro-organisms, stopping fermentation of said solution, and treating a crude petroleum emulsion with products of the fermentation.

13. The process that includes, fermenting a carbohydrate solution containing micro-organisms, chemically destroying the live organisms in said solution, and treating a crude petroleum emulsion with products of the fermentation.

14. The process that includes, fermenting a carbohydrate solution containing micro-organisms to produce alcohols in the proportion of at least substantially 8 to 16% by volume of said solution, stopping fermentation of said solution, and treating a crude petroleum emulsion with products of the fermentation.

15. The process that includes, fermenting a carbohydrate solution containing micro-organisms to produce alcohols in the proportion of at least substantially 8 to 16% by volume of said solution, adding to the solution a cyanogen salt in combination with a metallic base, then separating the liquid from said solution, and intimately admixing said liquid with a crude petroleum emulsion.

GEORGE D. BAVIN.
MAX POWELL.